(12) United States Patent
Sunderland et al.

(10) Patent No.: US 8,604,112 B2
(45) Date of Patent: Dec. 10, 2013

(54) ACID ENDCAPPED CAPROLACTONE OR VALEROLACTONE DISPERSING AGENTS

(75) Inventors: Patrick J. Sunderland, Rossendale (GB); Dean Thetford, Norden (GB); Thomas Forder, Sheffield (GB)

(73) Assignee: The Lubrizol Corporation, Wickliffe, OH (US)

( * ) Notice: Subject to any disclaimer, the term of this patent is extended or adjusted under 35 U.S.C. 154(b) by 135 days.

(21) Appl. No.: 13/062,323

(22) PCT Filed: Aug. 13, 2009

(86) PCT No.: PCT/US2009/053639
§ 371 (c)(1),
(2), (4) Date: Mar. 4, 2011

(87) PCT Pub. No.: WO2010/033323
PCT Pub. Date: Mar. 25, 2010

(65) Prior Publication Data
US 2011/0160370 A1    Jun. 30, 2011

Related U.S. Application Data

(60) Provisional application No. 61/097,900, filed on Sep. 18, 2008.

(51) Int. Cl.
*C08K 5/19*    (2006.01)
*C08K 5/17*    (2006.01)

(52) U.S. Cl.
USPC ........... 524/319; 524/394; 560/250; 562/400; 549/263

(58) Field of Classification Search
USPC .................. 524/319, 394; 560/250; 562/400; 549/263
See application file for complete search history.

(56) References Cited

FOREIGN PATENT DOCUMENTS

EP    0 233 684 A1 *    8/1987   ............. B01F 17/00
EP    0233684 A1    8/1987

* cited by examiner

*Primary Examiner* — Robert D. Harlan
(74) *Attorney, Agent, or Firm* — Michael F. Esposito; Teresan W. Gilbert

(57) ABSTRACT

The invention relates to a composition containing a particulate solid, a plastic material (such as a thermoplastic polymer) and a compound capable of having dispersant properties. The compound may be obtained/obtainable by reacting a fatty acid with either (i) a hydroxy-$C_{4-5}$-alkylene carboxylic acid, or (ii) a lactone. The invention further relates to novel compounds, and the use of the compound as a dispersant.

10 Claims, No Drawings

ACID ENDCAPPED CAPROLACTONE OR VALEROLACTONE DISPERSING AGENTS

CROSS REFERENCE TO RELATED APPLICATION

This application claims priority from PCT Application Ser. No. PCT/US2009/053639 filed on Aug. 13, 2009, which claims the benefit of U.S. Provisional Application No. 61/097,900 filed on Sep. 18, 2008.

FIELD OF INVENTION

The invention relates to a composition containing a particulate solid, a plastic material (such as a thermoplastic polymer) and a compound capable of being a dispersant.

BACKGROUND OF THE INVENTION

Thermoplastics such as PP (polypropylene), PE (polyethylene), etc., are normally coloured using pigment concentrates which are usually called masterbatches or compounds. These concentrates are prepared by mixing ingredients together and subjecting them to any of the processes commonly used for dispersing particulate solids in a thermoplastic polymer. Compounding or mixing in a twin-screw extruder is one of these processes. Pigment concentrations in these masterbatches may be from 20-70% and other additives may be present such as waxes, dispersants, lubricants and UV stabilisers.

Production of a masterbatch requires that the pigment is dispersed optimally in the thermoplastic polymer, i.e., fine particles with few aggregates. Problems can arise in the production of masterbatches if aggregates are present as this will lead to filter blocking of the extruder. The pigment concentrates are used to colour thermoplastic film, fibres and solid articles. Particular requirements are needed on the quality of these finished articles, for instance, in solid articles good dispersion of the pigment in order to maximize colour development, tinctorial strength and reduced speck: levels are also required. For films, incomplete dispersion of the pigment can lead to cracking, unwanted light scattering effects and specks. In fibres, incomplete dispersion of the pigment will result in filter blocking of the extruder and fibre breakage.

Waxes are used to disperse particulate solids in thermoplastic polymers. However, the waxes only wet the pigments and do not disperse them into a stable dispersion. Also, waxes are prone to migration to the surface of the thermoplastic article.

U.S. Pat. No. 3,778,287 discloses structures of poly 12-hydroxystearic acids (PHS) and polyricinoleic acids (PRA) and their use in aliphatic/aromatic ink/paint systems as dispersants for organic and inorganic pigments.

U.S. Pat. No. 4,797,400 discloses the use of the polymer containing a carboxylate functionality, e.g., poly(12-hydroxystearic acid) or polyricinoleic acid, as a dispersant in the presence of a particulate solid, a lubricant and a thermoplastic polymer.

British Patent 2 056 461 attempts to incorporate a dispersant onto a filler by employing poly 12-hydroxystearic acid or polyricinoleic acid.

U.S. Pat. No. 3,748,308 discloses polyesters containing carboxy groups and the polyesters are used as dispersing agents in organic liquids. These compounds contain aromatic diacids or anhydrides to generate the carboxy groups, and diol/triols for multiplicity.

International Publication WO 05/097872 discloses polyesters containing carboxy groups and used as dispersing agents for pigment concentrates for colouring thermoplastics. These agents contain diacids or anhydrides to generate the carboxy groups, and a mono, di or triol.

Fatty acid initiated polycaprolactone polymers are disclosed as intermediates to polyethylene imine dispersants in U.S. Pat. Nos. 4,645,611; and 4,861,380. The fatty acids disclosed therein have not been employed as a dispersant.

SUMMARY OF THE INVENTION

Any of the problems mentioned above can lead to less efficient processing in expensive extruder-type equipment, i.e., production costs increase. Therefore, a dispersant that reduces aggregates and specks, gives a finer state of dispersion, higher tinctorial strengths, improved brightness and faster rates of dispersion would be an advantage. A higher tinctorial strength in a masterbatch allows for a lower amount of masterbatch to be used in a final plastic composition. The dispersant is typically a solid below 45° C. which allows easier incorporation into masterbatches. A solid dispersant may also allow for more homogeneous mixing of pigment particles within the thermoplastic avoiding/reducing agglomeration of pigment particles.

The inventors of the present application have discovered that a compound capable of dispersing a pigment that allows for a thermoplastic to have at least one of (i) reduced filter blocking, (ii) improved tinctorials, (iii) higher pigment loadings for equivalent viscosity of masterbatches, and (iv) reduced speck levels. The present invention provides such a compound and compositions thereof.

In one embodiment, the invention provides a compound of Formula (1) represented by:

$$[\text{R—CO—(OACO)}_n\text{—O}^-]_x\text{M} \qquad \text{Formula (1)}$$

wherein each
R may be a lipophilic component of an alk(en)yl group containing 10 or more carbon atoms (typically R may contain 16 or more, or 20 or more carbon atoms);
A may be a $C_{4-5}$ alkylene group or mixtures thereof;
n may be 3-25;
M may be H, an ammonium ion, a quaternary ammonium ion, a cation of an alkali or alkaline earth metal, or a protonated amine (such as a protonated alkanolamine); and
x may be 1 or 2.

In one embodiment, the dispersing agent contains a mixture of a carboxylate or anhydride containing compound salted with an amine containing compound thereof.

In one embodiment, the invention provides for a product obtained/obtainable by a process comprising reacting a fatty acid with either (i) a hydroxy-$C_{4-5}$-alkylene carboxylic acid, or (ii) a lactone.

In one embodiment, the invention provides a process to prepare the compound of Formula (1) by reacting a fatty acid with either (i) a hydroxy-$C_{4-5}$-alkylene carboxylic acid, or (ii) a lactone.

In one embodiment, the invention provides for the use of the compound of Formula (1) as dispersing agent.

In one embodiment, the present invention provides a composition comprising a particulate solid, a plastic material (typically a thermoplastic polymer) and a compound of Formula (1) represented by:

$$[\text{R—CO—(OACO)}_n\text{—O}^-]_x\text{M} \qquad \text{Formula (1)}$$

wherein each

R may be a lipophilic component of an alk(en)yl group containing 10 or more carbon atoms (typically R may contain 16 or more, or 20 or more carbon atoms);

A may be a $C_{4-5}$ alkylene group or mixtures thereof;

n may be 3-25;

M may be H, an ammonium ion, a quaternary ammonium ion, a cation of an alkali or alkaline earth metal, or a protonated amine (such as a protonated alkanolamine); and x may be 1 or 2.

In one embodiment, the invention provides for the use of the compound defined above as a dispersant in a plastic material (typically a thermoplastic polymer).

DETAILED DESCRIPTION OF THE INVENTION

The present invention provides a composition as disclosed herein above.

The number average molecular weight of the R—CO—(OACO)$_n$ group may be between 250 to 7500, or 400 and 3500.

The hydroxy carboxylic acid from which A is derivable may be a hydroxy-$C_{4-5}$-alkylene carboxylic acid or a lactone. Examples of suitable hydroxy carboxylic acids include 5-hydroxy valeric acid and 6-hydroxy caproic acid. Specific examples of suitable lactones include caprolactone, valerolactone and alkyl substituted caprolactones such as 7-methyl caprolactone.

Typically, the R—CO— group of Formula (1) may be derived from a fatty acid containing 10 to 50, or 10 to 35 carbon atoms. Examples of a suitable fatty acid include stearic, ricinoleic, oleic, palmitic, erucic, behenic, lauric, myristic, linoleic (such as 9,11-linoleic, 9,12-linoleic, or 9,12,15-linolenic), abietic acid, 12-hydroxy dodecanoic, 5-hydroxy dodecanoic, 5-hydroxy decanoic, 4-hydroxy decanoic acid. Examples of a suitable mixture of fatty acids include $C_{12-24}$-branched chain aliphatic acids available as Isocarbs from Condea.

Other examples of fatty acids include mixtures of fatty acids derived from oils from naturally occurring sources such as sunflower oil, olive oil, rapeseed oil, castor oil, palm oil, coconut oil, linseed oil, soya bean oil, fish oil and the like, in either a hydrogenated (saturated) or unsaturated form. Further examples of fatty acids include the Unicid® acids (linear primary synthetic carboxylic acids) commercially available from Baker Petrolite Polymer Division.

Examples of suitable metals represented by M include lithium, sodium, potassium, calcium, magnesium and zinc.

In one embodiment, M of Formula (1) may be a protonated amine. The protonated amine may include a primary amine, selected from mono-$C_1$-$C_8$-alkylamines whose alkyl groups may be substituted by an N($C_1$-$C_4$-alkyl) group. Examples of a primary amine include methylamine, ethylamine, propylamine, butylamine or pentylamine.

The protonated amine may include a secondary amine, selected from di-$C_1$-$C_8$-alkylamines whose alkyl groups may be substituted by an N($C_1$-$C_4$-alkyl), group, and cyclic amines, which have 4 to 6 carbon atoms and whose cyclic structure may be interrupted by O and/or N—$C_1$-$C_4$-alkyl. Examples of a secondary amine include dimethylamine, diethylamine, dipropylamine, dibutylamine or dipentylamine.

The protonated alkanolamine may include ethanolamine, isopropanol amine, diethanolamine, triethanolamine, N,N-diethylethanol amine, N,N-dimethylethanolamine, N,N-dibutylethanolamine, 3-amino-1,2-propanediol, serinol, 2-amino-2-methyl-1,3-propanediol, 2-amino-2-methyl-1-propanol, tris(hydroxymethyl)-aminomethane, diisopropanolamine, N-methyldiethanolamine, 2-(2-aminoethylamino)ethanol, or mixtures thereof.

Examples of suitable amines and alkanolamines represented by M include butylamine, dibutylamine, diethanolamine, triethanolamine and 2-amino-2-methyl-1-propanol.

The dispersant of Formula (1) may be used in the production of dispersible solids in powder particle and/or fibre particle form, particularly of dispersible pigments or polymeric fillers, where the particles are coated with the dispersant. Coatings of this kind, of both organic and inorganic solids, are carried out in a known way, as described for example in EP-A-0 270 126. Specifically, in the case of pigments, it is possible to coat the pigment surface during or after the synthesis of the pigments, by, for example, adding the dispersants of Formula (1) to the pigment suspension, or during or after the operation of pigment finish.

If the dry composition consists essentially of the dispersant of Formula (1) and the particulate solid, it typically contains at least 0.2%, at least 0.5% or at least 1.0% dispersant of Formula (1) based on weight of the particulate solid. In one embodiment, the dry composition contains not greater than 100%, not greater than 50%, not greater than 20% or not greater than 10% by weight of dispersant of Formula (1) based on the weight of the particulate solid.

Industrial Application

In one embodiment, the compound as described herein is a processing aid or dispersant.

The compound in different embodiments may be present in the composition of the invention in a range selected from 0.1 to 50 wt %, or 0.25 to 35 wt %, and 0.5 to wt %.

The particulate solid present in the composition may be any inorganic or organic solid material. In one embodiment, the particulate solid is a pigment.

The particulate solid present in the composition may be any inorganic or organic solid material which is substantially insoluble in the thermoplastic at the temperature concerned and which it is desired to stabilise in a finely divided form therein. The particulate solids may be in the form of a granular material, a fibre, a platelet or in the form of a powder, often a blown powder. In one embodiment, the particulate solid is a pigment.

Examples of suitable solids are pigments for solvent inks; pigments, extenders, fillers, blowing agents and flame retardants for paints and plastics materials; dyes, especially disperse dyes; optical brightening agents and textile auxiliaries for solvent dyebaths, inks and other solvent application systems; solids for oil-based and inverse-emulsion drilling muds; dirt and solid particles in dry cleaning fluids; metals; particulate ceramic materials and magnetic materials for ceramics, piezoceramic printing, abrasives, capacitors, fuel cells, ferrofluids, conductive inks, magnetic recording media, water treatment and hydrocarbon soil remediation; organic and inorganic nanodisperse solids; fibres such as wood, paper, glass, steel, carbon and boron for composite materials; and biocides, agrochemicals and pharmaceuticals which are applied as dispersions in organic media.

In one embodiment, the solid is an organic pigment from any of the recognised classes of pigments described, for example, in the Third Edition of the Colour Index (1971) and subsequent revisions of, and supplements thereto, under the chapter headed "Pigments". Examples of organic pigments are those from the azo, disazo, trisazo, condensed azo, azo lakes, naphthol pigments, anthanthrone, anthrapyrimidine, anthraquinone, benzimidazolone, carbazole, diketopyrrolopyrrole, flavanthrone, indigoid pigments, indanthrone, isodibenzanthrone, isoindanthrone, isoindolinone, isoindoline, isoviolanthrone, metal complex pigments, oxazine, perylene, perinone, pyranthrone, pyrazoloquinazolone, quinacridone, quinophthalone, thioindigo, triarylcarbonium pigments, triphendioxazine, xanthene and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. In one embodiment, the organic pigments are phthalocyanines, especially copper phthalocyanines, monoazos, diazos, indanthrones, anthanthrones, quinacridones, diketopyrrolopyrroles, perylenes and carbon blacks.

Examples of inorganic pigments include metallic oxides such as titanium dioxide, rutile titanium dioxide and surface coated titanium dioxide, titanium oxides of different colours such as yellow and black, iron oxides of different colours such as yellow, red, brown and black, zinc oxide, zirconium oxides, aluminium oxide, oxymetallic compounds such as bismuth vanadate, cobalt aluminate, cobalt stannate, cobalt zincate, zinc chromate and mixed metal oxides of manganese, nickel, titanium, chromium, antimony, magnesium, cobalt, iron and aluminium, Prussian blue, vermilion, ultramarine, zinc phosphate, zinc sulphide, molybdates and chromates of calcium and zinc, metal effect pigments such as aluminium flake, copper, and copper/zinc alloy, pearlescent flake such as lead carbonate and bismuth oxychloride.

Inorganic solids include extenders and fillers such as ground and precipitated calcium carbonate, calcium sulphate, calcium oxide, calcium oxalate, calcium phosphate, calcium phosphonate, barium sulphate, barium carbonate, magnesium oxide, magnesium hydroxide, natural magnesium hydroxide or brucite, precipitated magnesium hydroxide, magnesium carbonate, dolomite, aluminium trihydroxide, aluminium hydroperoxide or boehmite, calcium and magnesium silicates, aluminosilicates including nanoclays, kaolin, montmorillonites including bentonites, hectorites and saponites, mica, talc including muscovites, phlogopites, lepidolites and chlorites, chalk, synthetic and precipitated silica, fumed silica, metal fibres and powders, zinc, aluminium, glass fibres, refractory fibres, carbon black including single- and multi-walled carbon nanotubes, reinforcing and non-reinforcing carbon black, graphite, Buckminsterfullerenes, diamond, alumina, quartz, silica gel, wood flour, powdered paper/fibre, cellulosic fibres such as hemp, sisal, flax, coconut fibre, banana leaf and the like, vermiculite, zeolites, hydrotalcites, fly ash from power plants, incinerated sewage sludge ash, pozzolanes, blast furnace slag, asbestos, chrysotile, anthophylite, crocidolite, wollastonite, attapulgite and the like, particulate ceramic materials such as alumina, zirconia, titania, silicon nitride, aluminium nitride, boron nitride, silicon carbide, boron carbide, mixed silicon-aluminium nitrides and metal titanates; particulate magnetic materials such as the magnetic oxides of transition metals, often iron and chromium, e.g., gamma-$Fe_2O_3$, $Fe_3O_4$, and cobalt-doped iron oxides, ferrites, e.g., barium ferrites; and metal particles, for instance metallic aluminium, iron, nickel, cobalt, copper, silver, gold, palladium, and platinum and alloys thereof.

Other useful solid materials include flame retardants such as pentabromodiphenyl ether, octabromodiphenyl ether, decabromodiphenyl ether, hexabromocyclododecane, ammonium polyphosphate, melamine, melamine cyanurate and borates; biocides or industrial microbial agents such as those mentioned in Tables 2, 3, 4, 5, 6, 7, 8 and 9 of the chapter entitled "Industrial Microbial Agents" in Kirk-Othmer's Encyclopedia of Chemical Technology, Volume 13, 1981, $3^{rd}$ Edition.

In one embodiment, thermoplastic resins include polyolefins, polyesters, polyamides, polycarbonates, polyurethanes, polystyrenics, poly(meth)acrylates, celluloses and cellulose derivatives. Said compositions may be prepared in a number of ways but melt mixing and dry solid blending are typical methods. Examples of a suitable thermoplastic include (low density, or linear low density or high density) polyethylene, polypropylene, polystyrene, polyethylene terephthalate (PET), polybutylene terephthalate (PBT), nylon 6, nylon 6/6, nylon 4/6, nylon 6/12, nylon 11 and nylon 12, polymethylmethacrylate, polyethersulphone, polysulphones, polycarbonate, polyvinyl chloride (PVC), thermoplastic polyurethane, ethylene vinyl acetate (EVA), Victrex PEEK™ polymers (such as oxy-1,4-phenyleneoxy-1,4-phenylene-carbonyl-1,4-phenylene polymers) and acrylonitrile butadiene styrene polymers (ABS); and various other polymeric blends or alloys.

If desired, the compositions containing plastic material may contain other ingredients, for example dispersants other than the compound of the present invention, antifogging agents, nucleators, blowing agents, flame retardants, process aids, surfactants, plasticizers, heat stabilizers, UV absorbers, anti-oxidants, fragrances, mould release aids, anti-static agents, anti-microbial agents, biocides, coupling agents, lubricants (external and internal), impact modifiers, slip agents, air release agents and viscosity depressants.

The compositions typically contain from 1 to 95% by weight of the particulate Solid, the quantity depending on the nature of the solid and the relative densities of the solid and the polar organic liquid. For example, a composition in which the solid is an organic material, such as an organic pigment, in one embodiment contains from 15 to 60% by weight of the solid whereas a composition in which the solid is an inorganic material, such as an inorganic pigment, filler or extender, in one embodiment contains from 40 to 90% by weight of the solid based on the total weight of composition.

The composition containing the plastic material may be prepared by any of the conventional methods known for preparing thermoplastic compounds. Thus, the solid, the thermoplastic polymer, and the dispersant may be mixed in any order, the mixture then being subjected to a mechanical treatment to reduce the particles of the solid to an appropriate size, for example, by Banbury mixing, ribbon blending, twin-screw extrusion, twin-roll milling, compounding in a Buss co-kneader, or similar equipment.

In one embodiment, the composition of the invention further includes one or more additional known dispersants.

In one embodiment, the invention provides for a micronised composition as is described herein. In one embodiment, the composition further comprising at least one of either (i) an amorphous poly-α-olefin, or (ii) polyolefin wax, have a particle size fraction of at least 10 wt % having a diameter of 1 mm or less, or 0.5 mm or less, or 0.1 mm or less, or 0.05 mm or less. In one embodiment, the particle size fraction may be 50 nm to 1 mm, or 100 nm to 0.5 mm.

In one embodiment, the invention provides for a mixture or blend of the compositions herein described with a wax carrier or processing aid. Examples of such waxes include paraffin wax, polyethylene wax, polypropylene wax, ethylene-bis-stearamide wax, hydrogenated castor oil wax, carnauba wax and the like.

The following examples provide illustrations of the invention. These examples are non exhaustive and are not intended to limit the scope of the invention.

EXAMPLES

Comparative Dispersant A (ComparA): Polyhydroxystearic acid (Mn of about 850) is heated in a vessel until molten. Sasol C105, Fischer Tropsch wax (650 parts, ex. Sasol Wax GmbH, (solidifying point: 104°-110° C.; mean molecular weight: 1262; average molecular formula: $C_{90}H_{182}$) is then added in portions to the polyhydroxystearic acid, maintaining a stirrable mass to form a mixture. The mixture is stirred with heating until a homogeneous liquid is obtained. The homogeneous liquid is poured into a second vessel and allowed to cool. Once solidified, the material is cooled to −10° C. for 2 hours, before breaking into individual pieces of about 2 cm. The material is then milled on a Glen Creston rotary pin mill, without a sieve screen, to produce a fine granule.

Comparative Dispersant B (ComparB): Stearic acid (Ex Aldrich Chemical, 113.45 parts) and epsilon-caprolactone (Ex Aldrich Chemical, 136.55 parts) are stirred together under a nitrogen atmosphere at 120° C. Zirconium (IV) butoxide (0.75 parts) is added, prior to reaction temperature being increased to 200° C. Stirring is continued for 6 hours. The molten solid is poured into steel trays and allowed to cool to ambient temperature. The resulting pale brown wax is frozen with liquid nitrogen and broken into lumps. The resulting lumps are milled to a powder fine enough to pass through a 1 mm sieve:

Comparative Dispersant C (ComparC): Unicid 550, a straight-chain synthetic fatty acid of approx 50 carbon atoms, marketed by Baker-Hughes Corporation.

Comparative Dispersant D (ComparD): Unicid 350, a straight-chain fatty acid of approx 24 carbon atoms marketed by Baker-Hughes Corporation.

Example 1

Behenic acid (Ex Aldrich Chemical, 332 parts) and epsilon-caprolactone (Ex AldriCh Chemical, 668 parts) are stirred together under a nitrogen atmosphere at 120° C. Zirconium (IV) butoxide (3 parts) is added, prior to reaction temperature being increased to 200° C. Stirring is continued for 6 hours. The molten solid is poured into steel trays and allowed to cool to ambient temperature. The resulting pale brown wax is frozen with liquid nitrogen and broken into lumps. The resulting lumps are milled to a powder fine enough to pass through a 1 mm sieve.

Examples 2 to 29

These Examples are prepared in a similar manner to Example 1, except for the reagents and quantities disclosed in the following table:

| Example | Amount of E-Cap (parts) | Acid Reacted | Amount. of Acid (parts) | Catalyst Amount (parts) |
|---|---|---|---|---|
| 2 | 120 | Hydrogenated rapeseed acid | 55 | 0.5 |
| 3 | 70 | Unicid ® 350 | 36 | 0.4 |
| 4 | 149 | Lauric acid | 26 | 0.5 |
| 5 | 144 | Lauric acid | 32 | 0.5 |
| 6 | 131 | Behenic acid | 44 | 0.5 |
| 7 | 135 | Behenic acid | 40 | 0.5 |
| 8 | 140 | Behenic acid | 35 | 0.5 |
| 9 | 128 | Behenic acid | 48 | 0.5 |
| 10 | 123 | Behenic acid | 52 | 0.5 |
| 11 | 140 | Stearic acid | 35 | 0.5 |
| 12 | 133 | Stearic acid | 42 | 0.5 |
| 13 | 136 | Stearic acid | 113 | 0.75 |
| 14 | 154 | Stearic acid | 96 | 0.75 |
| 15 | 177 | Stearic acid | 73 | 0.75 |
| 16 | 75 | Myristic acid | 25 | 0.3 |
| 17 | 73 | Palmitic acid | 27 | 0.3 |
| 18 | 69 | Arachidic acid | 31 | 0.3 |
| 19 | 134 | Edenor $C_{22-85}$ | 66 | 0.6 |
| 20 | 161 | Lauric acid | 14 | 0.5 |
| 21 | 164 | Myristic acid | 11 | 0.5 |
| 22 | 152 | Behenic acid | 23 | 0.5 |
| 23 | 156 | Oleic acid | 19 | 0.5 |
| 24 | 148 | Erucic acid | 27 | 0.5 |
| 25 | 86 | Myristic acid | 14 | 0.3 |
| 26 | 91 | Myristic acid | 9 | 0.3 |
| 27 | 82 | Palmitic acid | 18 | 0.3 |
| 28 | 87 | Palmitic acid | 13 | 0.3 |
| 29 | 81.4 | Arachidic acid | 19 | 0.3 |

Footnote:
E-Cap is epsilon-caprolactone
Unicid ® 350 is commercially available from Baker Hughes Corporation
Catalyst is zirconium (IV) butoxide
Edenor $C_{22-85}$ is a distilled, hydrogenated rapeseed acid commercially available from Cognis.

Examples 30 to 31

These examples are prepared in a similar manner to Examples 1, except for including the addition of delta-valerolactone to the reaction vessel. Details of reagents and quantities are disclosed in the following table:

| Example | Amount of E-Cap (parts) | Amount of D-Val (parts) | Acid Reacted | Amount of Acid (parts) | Catalyst Amount (parts) |
|---|---|---|---|---|---|
| 30 | 123 | 14 | Stearic acid | 38 | 0.5 |
| 31 | 18 | 112 | Stearic acid | 45 | 0.5 |

Footnote:
E-Cap is epsilon-caprolactone
D-Val is delta-velerolactone
Catalyst is zirconium (IV) butoxide Masterbatch Preparation: Each of the dispersants (60 parts) is charged to a Henschel mixer with Heuco Green 600703K (Pigment Green 7, 200 parts) and LDPE pellets (Exxon Mobil LD600 powder 240 parts). The materials are blended together for 60 seconds to form a premix. This premix is compounded through a Thermo'Prism TSE16TC twin screw extruder, with a screen pack profile of 400/60 mesh. The temperature profile for the extruder zones is 60/130/140/160/160° C. from feeder to die. The pressure in bar behind the screen pack is recorded digitally, and the pressure after 900 seconds is presented in the table below. In order to give material for colour strength measurement the extruder screws are stopped, the filter pack completely removed and the screws restarted, thus allowing material with full pigment charge to be collected.

Letdown Preparation: Evaluation of the masterbatches thus prepared are performed on a Polymix 110L two-roll mill equipped with polished chrome rollers. The roller temperatures are 115° C. on the front roller and 85° C. on the rear roller. Exxon Mobil LD605BA pellets (96 parts) are put into the "nip" of the mill and allowed to heat for 1 minute. Roller rotation was started at 5 rpm and the polymer allowed to form a band by increasing speed to 10 rpm and decreasing the nip setting to 0.75 mm. Plaswhite PE7024 white LDPE masterbatch (60% $TiO_2$, 3.33 parts) was added to the nip, roller speed increased to 20 rpm and mixed into the base polymer by manually manipulating the material from side to side, mixing for approximately 1 minute. Each of the masterbatches prepared in the paragraph above (0.5 parts) was added to the nip, roller speed increased to 30 rpm, and mixed in the same way for 3 minutes. The polymer is then stripped from the rolls, rolled into a ball, and passed through the nip at 0.75 mm. This is repeated 10 times to give a high level dispersion.

The sheet (or "hide") thus prepared, 10 parts is placed in a stencil inside a Bridge hydraulic press. The material is pre-warmed for 3 minutes at 160° C. temperature and then pressed under heating for 30 seconds at 1600 psi pressure. Cooling water is then started to allow the sample to cool to 60° C. The material is removed and the colouristic properties measured on a DataColour Spectrophotometer. This is quoted as the colour strength in % compared to a standard (Comparative Sample A) which is set at 100.

The results obtained from the tests described above are shown in the table below. Typically, better results are obtained for examples with a higher percentage of colour strength and lower maximum filter pressure:

| Sample Name | Max Filter Pressure, bar | Colour Strength, % |
|---|---|---|
| Example 1 | 76 | 123.36 |
| Example 2 | 68 | 122.59 |
| Example 3 | 95 | 124.32 |
| Example 4 | 51 | 120.23 |
| Example 5 | 48 | 116.77 |
| Example 6 | 78 | 123.09 |
| Example 7 | 64 | 118.61 |
| Example 8 | 54 | 125.77 |
| Example 9 | 64 | 122.74 |
| Example 10 | 74 | 125.07 |
| Example 11 | 62 | 122.56 |
| Example 12 | 58 | 117.89 |
| Example 13 | 56 | 120.69 |
| Example 14 | 58 | 120.93 |
| Example 15 | 90 | 121.95 |
| Example 16 | 67 | 120.28 |
| Example 17 | 92 | 117.14 |
| Example 18 | 54 | 118.88 |
| Example 19 | 57 | 124.69 |
| Example 20 | 92 | 128.44 |
| Example 21 | 95 | 155.69 |
| Example 22 | 91 | 127.81 |
| Example 23 | 95 | 127.53 |
| Example 24 | 87 | 120.09 |
| Example 25 | 92 | 127.39 |
| Example 26 | 90 | 129.39 |
| Example 27 | 66 | 122.49 |
| Example 28 | 91 | 124.54 |
| Example 29 | 70 | 135.87 |
| Example 30 | 74 | 126.75 |
| Example 31 | 93 | 129.98 |
| Compar A | 64 | 100 |
| Compar B | 94 | 112.9 |
| Compar C | 52 | 94.08 |
| Compar D | 95 | 87.47 |

The data obtained from the tests indicates that the compositions of the invention have acceptable performance after more than one thousand seconds. Accordingly, the composition of the present invention is capable of dispersing a pigment that also allows for a thermoplastic to have at least one of a reduction in aggregates and specks, provides a finer state of dispersion, has acceptable tinctorial strength, and has improved brightness and faster rates of dispersion.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about". Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composition comprising a particulate solid, a plastic material and a compound of Formula (1) represented by:

$$[R—CO—(OACO)_n—O^-]_xM \qquad \text{Formula (1)}$$

wherein, independently, each variable

R is a lipophilic component of an alk(en)yl group containing 10 or more carbon atoms;

A is a $C_{4-5}$ alkylene group or mixtures thereof;

n is 3-25;

M is H, an ammonium ion, a quaternary ammonium ion, a cation of an alkali or alkaline earth metal, or a protonated amine; and x is 1 or 2.

2. The composition of claim 1, wherein the plastic material is a thermo-plastic polymer.

3. The composition of claim 2, wherein the plastic material is thermoset resin or a thermoplastic resin.

4. The composition of claim 1, wherein the particulate solid is a pigment, a filler, or other particulate additive.

5. The composition of claim 1, wherein the particulate solid is present at 1 to 95% by weight of the composition.

6. The composition of claim 1, wherein the compound of Formula (1) is present at 0.25 to 35 wt % of the composition.

7. The composition of claim 1, wherein at least 10 wt % of the composition has a particle size fraction of 1 mm or less, or 0.5 mm or less, or 0.1 mm or less, or 0.05 mm or less.

8. The composition of claim 1, wherein at least 10 wt % of the composition has a particle size fraction of 50 nm to 1 mm, or 100 nm to 0.05 mm.

9. A product obtained/obtainable by a process comprising reacting a fatty acid with either (i) a hydroxy-$C_{4-5}$-alkylene carboxylic acid, or (ii) a lactone.

10. A process to prepare a process to prepare the compound of Formula (1) by reacting a fatty acid with either (i) a hydroxy-$C_{4-5}$-alkylene carboxylic acid, or (ii) a lactone.

* * * * *